(12) United States Patent
Tosaka et al.

(10) Patent No.: US 11,330,128 B2
(45) Date of Patent: May 10, 2022

(54) ADJUSTMENT IMAGE DATA FOR USE IN IMAGING OPERATION AND IMAGE FORMING APPARATUS

(71) Applicants: Akihiko Tosaka, Kanagawa (JP); Megumi Arai, Kanagawa (JP); Kohji Yoshimura, Kanagawa (JP); Yoshiko Konaka, Kanagawa (JP)

(72) Inventors: Akihiko Tosaka, Kanagawa (JP); Megumi Arai, Kanagawa (JP); Kohji Yoshimura, Kanagawa (JP); Yoshiko Konaka, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/952,107

(22) Filed: Nov. 19, 2020

(65) Prior Publication Data

US 2021/0160392 A1    May 27, 2021

(30) Foreign Application Priority Data

Nov. 21, 2019   (JP) .............................. JP2019-210372

(51) Int. Cl.
*H04N 1/08* (2006.01)
*H04N 1/00* (2006.01)
*H04N 1/047* (2006.01)

(52) U.S. Cl.
CPC ..... *H04N 1/00809* (2013.01); *H04N 1/00005* (2013.01); *H04N 1/00037* (2013.01); *H04N 1/047* (2013.01)

(58) Field of Classification Search
CPC .......... H04N 1/00809; H04N 1/00005; H04N 1/00037
See application file for complete search history.

(56) References Cited

U.S. PATENT DOCUMENTS

| | | | |
|---|---|---|---|
| 9,100,611 B2 * | 8/2015 | Kishi ................. | H04N 1/00761 |
| 2005/0024694 A1 * | 2/2005 | Itoh ..................... | H04N 1/32016 |
| | | | 358/500 |
| 2008/0225351 A1 | 9/2008 | Sudo et al. | |
| 2014/0022565 A1 | 1/2014 | Goto et al. | |
| 2019/0124223 A1 | 4/2019 | Tanigawa | |

FOREIGN PATENT DOCUMENTS

| | | |
|---|---|---|
| JP | 5895759 | 3/2016 |
| JP | 6436380 | 12/2018 |
| JP | 2019-080103 | 5/2019 |

* cited by examiner

*Primary Examiner* — Ibrahim Siddo
(74) *Attorney, Agent, or Firm* — Xsensus LLP

(57) ABSTRACT

Adjustment image data is for use in adjusting imaging operation. The adjustment image data is stored in a storage of an image forming apparatus and read from the storage to form an image on a sheet of paper at the time of adjusting an imaging operation of the image forming apparatus. The adjustment image data includes a single identification mark located in the vicinity of a longitudinal center of the sheet of paper.

12 Claims, 6 Drawing Sheets

ADJUSTMENT IMAGE DATA FOR USE IN IMAGING OPERATION AND IMAGE FORMING APPARATUS

CROSS-REFERENCE TO RELATED APPLICATIONS

The present application claims priority under 35 U.S.C. § 119 to Japanese Patent Application No. 2019-210372, filed on Nov. 21, 2019. The contents of which are incorporated herein by reference in their entirety.

BACKGROUND OF THE INVENTION

1. Field of the Invention

The present invention relates to adjustment image data for use in imaging operation and an image forming apparatus.

2. Description of the Related Art

Conventionally, adjustment image data for use in imaging operation has been known. Such adjustment image data is stored in a storage of an image forming apparatus and read from the storage for use in generating an image on sheets of paper at the time of adjusting an imaging operation of the image forming apparatus.

For example, such adjustment image data is used to detect misalignment of an image and contains identification marks separately placed at the top and bottom parts of the length of a sheet of paper (described in Japanese Patent No. 5895759, for instance). In the case of a sheet of paper provided with an adjustment image for use in imaging operation and having a size larger than a platen, the entire adjustment image is read in the following manner. That is, a sheet of paper is placed on the platen with a bottom part of the sheet protruding from the platen, to read the upper region of the adjustment image from the top part of the paper. The sheet is then rotated by 180 degrees on the platen to read the lower region of the adjustment image from the bottom part of the sheet, whereby the entire adjustment image on the paper is read. It is thus possible to detect misalignment of an image from a plurality of read images representing the adjustment image read through repeated reading operations, to calculate a correction amount for the misaligned image.

In this example, the sheet of paper is provided with the identification marks on the top and bottom parts, therefore, each read image of the sheet contains the identification marks, enabling obtainment of identification information from each read image.

In this example, however, it may not be able to generate such an adjustment image on smaller-sized sheets of paper.

SUMMARY OF THE INVENTION

According to one aspect of the present invention, adjustment image data is for use in adjusting imaging operation. The adjustment image data is stored in a storage of an image forming apparatus and read from the storage to form an image on a sheet of paper at the time of adjusting an imaging operation of the image forming apparatus. The adjustment image data includes a single identification mark located in the vicinity of a longitudinal center of the sheet of paper.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
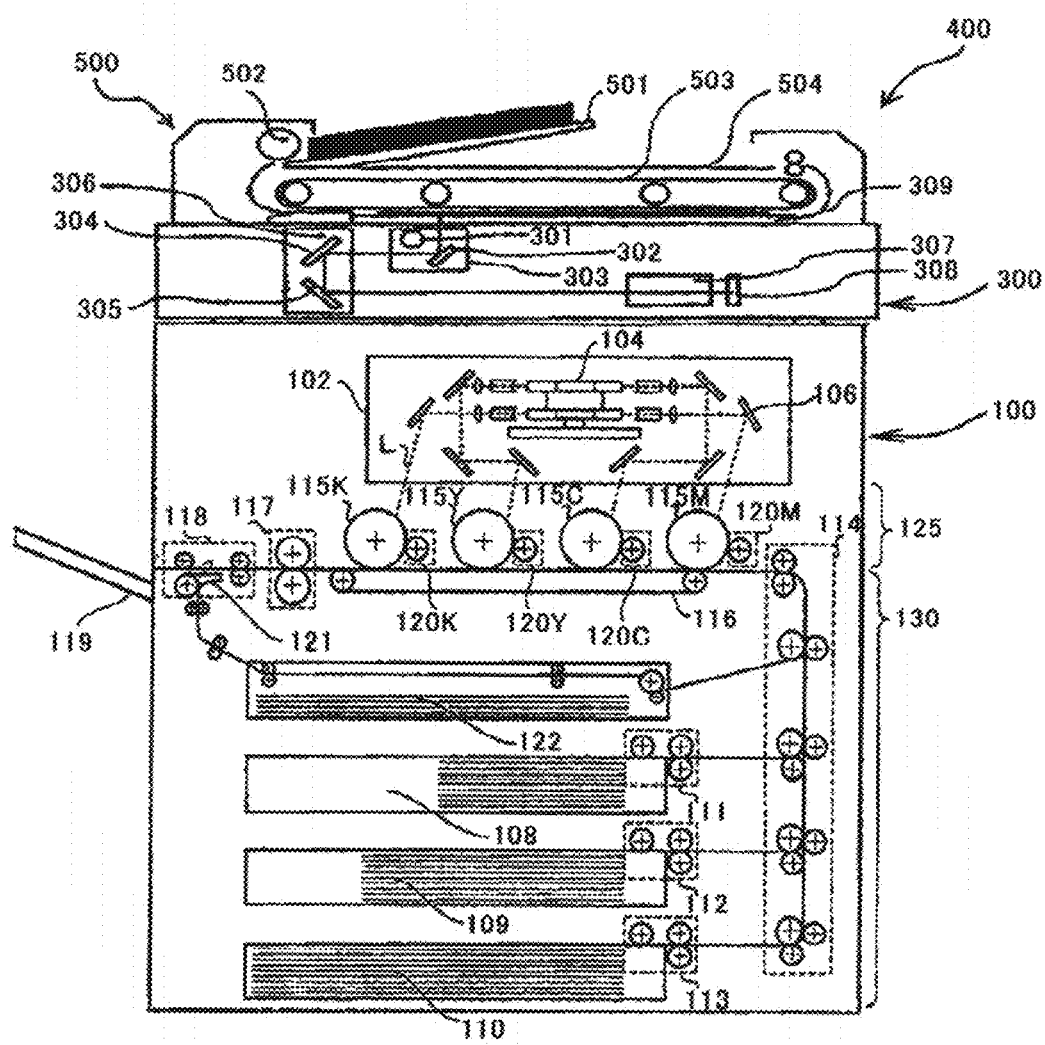
FIG. 1 is a schematic configuration diagram of an image forming apparatus according to one embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide adjustment image data for use in adjusting imaging operation and including a single identification mark located in the vicinity of a longitudinal center of the sheet of paper. The adjustment image data is stored in a storage of an image forming apparatus and read from the storage to form an image on a sheet of paper at the time of adjusting an imaging operation of the image forming apparatus.

FIG. 1 is a schematic configuration diagram of an image forming apparatus according to the present embodiment.

As illustrated in FIG. 1, an image forming apparatus 400 includes an automatic document feeder (ADF) 500 that automatically feeds a set document, a scanner (reading device) 300 that reads the document, and a printer 100 that forms a toner image.

The printer 100 includes a writing device 102, an image forming unit 125, and a transfer/fixing unit 130. The writing device 102 includes optical elements such as a semiconductor laser element and a polygon mirror 104. The image forming unit 125 includes photoconductor drums, a charging device, and a developing device. Also, the transfer/fixing unit 130 includes a fixing unit 117 and a conveyance belt 116.

The writing device 102 includes a laser output unit. An optical beam is emitted from the laser output unit, collected by a cylindrical lens, and deflected by a polygon mirror 104 to a reflection mirror 106. In the embodiment, the number of optical beams L are four corresponding to four colors, cyan (C), magenta (M), yellow (Y), and black (K). The optical beams expose photoconductor drums 115K to 115M in the form of image through imaging forming lenses to form electrostatic latent images thereon.

Along with the rotation of the photoconductor drums 115K to 115M, the formed electrostatic latent images are conveyed to developing units 120K to 120M. The electrostatic latent images are developed with a developer and developed images are formed and carried on the photoconductor drums 115K to 115M. Along with the rotation of the photoconductor drums 115K to 115M, the developed images are conveyed to the transfer/fixing unit 130. The transfer/fixing unit 130 includes paper cassettes 108, 109, and 110, paper feeding units 111, 112, and 113, a vertical conveyance unit 114, the conveyance belt 116, and the fixing unit 117. Sheets of paper such as high-quality paper or plastic sheets are accumulated in the paper cassettes 108 to 110, and fed by the paper feeding units 111 to 113 respectively, and conveyed by the vertical conveyance unit 114 to locations abutting on the photoconductor drums 115K to 115M.

The developed images are transferred from the photoconductor drums 115K to 115M onto a sheet of paper electrostatically adhered to the conveyance belt 116 under a transfer bias potential. After the transfer, the sheet on which the images are formed is supplied to the fixing unit 117. The fixing unit 117 includes a fixing member such as a fixing roller including silicone rubber or fluoro-rubber, and serves to fix the images on the sheet by applying pressure and heat to the multicolor developed images and the sheet. This heating process for fixing may cause the sheet to minutely shrink.

The sheet after the fixing is ejected onto a paper ejection tray 119 by a paper ejection unit 118. For duplex printing, a separation lever 121 is set to an upper position to feed the sheet not to the paper ejection tray 119 but to a duplex printing paper feeding unit 122. Subsequently, the sheet is fed again from the duplex printing paper feeding unit 122 to transfer an image onto the back side of the sheet. The sheet having the images formed and fixed on both sides is ejected to the paper ejection tray 119 via the separation lever 121 set to a lower position.

The automatic document feeder 500 is placed on the scanner 300 and includes a document table 501, a document separating/feeding roller 502, a document conveyance belt 503, and a document ejection tray 504.

After documents are set on the document table 501, in response to a reading start instruction, the automatic document feeder 500 feeds the documents from the document table 501 one by one with the document separating/feeding roller 502. Each of the documents is guided by the document conveyance belt 503 onto a contact glass 309 and temporarily stops there.

The scanner 300 reads image information of each document at a temporary stop on the contact glass 309. Subsequently, the document conveyance belt 503 resumes conveying the document, to eject the document to the document ejection tray 504.

The automatic document feeder 500 feeds a document to the contact glass 309 or the user places a document on the contact glass 309 and manipulates an operation panel 48 to start copying. This causes a light source 301 on a first movable member 303 to turn on. At the same time, the first movable member 303 and a second movable member 306 are moved along guide rails.

The document on the contact glass 309 is then irradiated with the light from the light source 301. Reflected light by the document is guided to a mirror 302 on the first movable member 303, mirrors 304 and 305 on the second movable member 306, and a lens 307, and is received by a charge-coupled device (CCD) 308. As a result, the CCD 308 reads image information on the document, and transmits the image information to an A/D conversion circuit for analog to digital data conversion. This image information is transmitted from an information output unit to a control unit of the printer 100.

Meanwhile, the writing device 102 of the printer 100 generates an electrostatic latent image on the basis of the image information read by the scanner 300.

Figure 2:
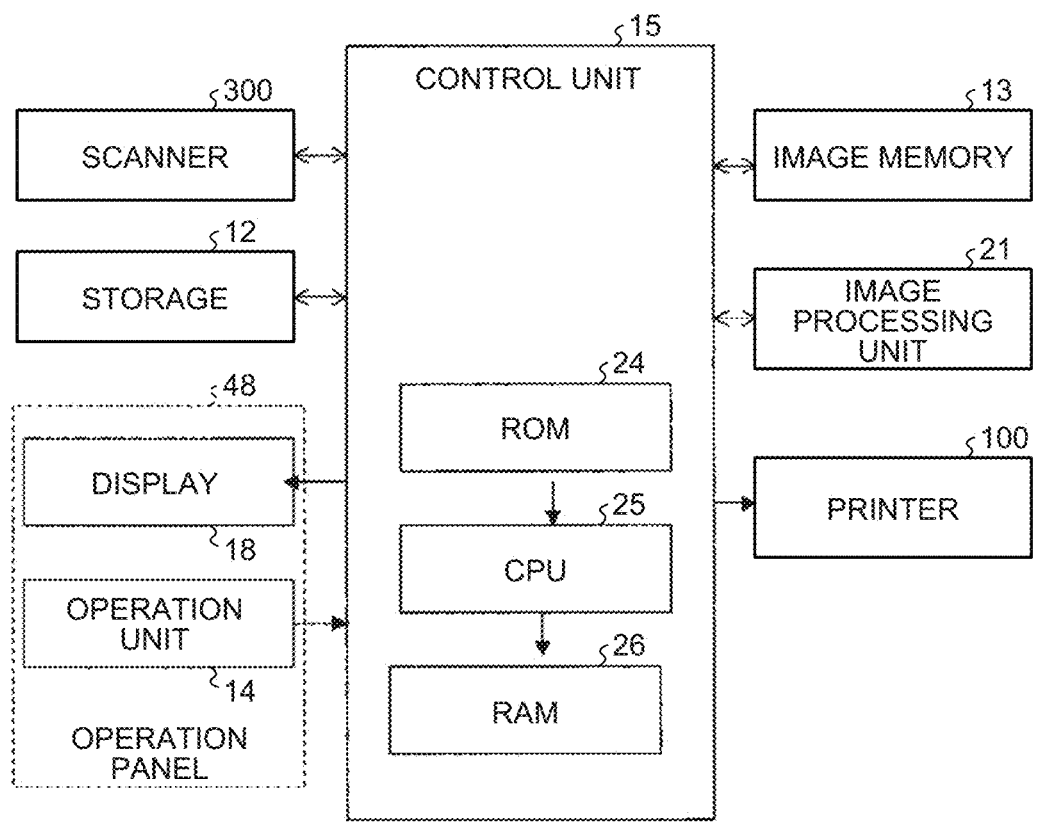
FIG. 2 is a block diagram illustrating an exemplary configuration of a control system of the image forming apparatus.

FIG. 2 is a block diagram illustrating an exemplary configuration of a control system of the image forming apparatus 400.

As illustrated in FIG. 2, the image forming apparatus 400 includes a control unit 15. The control unit 15 is connected to the scanner 300, a storage 12, an image memory 13, an image processing unit 21, the printer 100, and an operation unit 14 and a display 18 constituting the operation panel 48. The operation unit 14 is operated for mode setting to an image forming mode or a correction mode. The operation unit 14 is also used for setting an imaging condition. The display 18 serves to display imaging conditions and else to be selected through the operation unit 14.

The control unit 15 includes a read only memory (ROM) 24, a central processing unit (CPU) 25, and a random access memory (RAM) 26. The ROM 24 serves to store system programming data to control the image forming apparatus 400 as a whole. The RAM 26 serves as a work memory. The ROM 24 temporarily stores, for example, read data from an adjustment image and a control command. In this example, upon power-on, the CPU 25 reads the system programming data from the ROM 24 to initiate the system and control the entire image forming apparatus 400 according to operation data from the operation unit 14.

The storage 12 is connected to the control unit 15. The storage 12 includes a non-volatile memory such as an EEPROM, and stores a program to execute the correction mode. The CPU 25 reads and executes this program. The storage 12 also stores adjustment image data for use in imaging operation, and the CPU 25 reads the image data for forming an adjustment image on a sheet of paper, as described later.

In the present embodiment, the maximum paper size of the printer 100, i.e., the size that the printer 100 can form an image thereon, is larger than the maximum scan size of the scanner 300. Specifically, the maximum scan size of the scanner 300 is A3 while the maximum paper size of the printer 100 is A3 extended or A3 wide.

Next, the correction mode of the present embodiment in which an imaging operation is adjusted will be described.

In the image forming apparatus 400, a sheet of paper may be fed at incorrect timing or in a posture laterally offset from an intended posture, which results in forming an image at an offset position from an intended position on the sheet of paper. In addition, heating for fixation may cause a sheet of paper and an image thereon to minutely shrink, resulting in changing an image magnification from a desired image magnification. Further, an image on the front side of the sheet is affected twice by a minute shrinkage of the sheet due to the heating for fixation while an image on the back side is affected thereby only once. As a result, the images on the front side and the back side of the sheet may differ from each other in magnification. The images may be formed at different positions on the front side and the back side. In view of this, at the time of setting the image forming apparatus, the service personnel manipulates the operation panel 48 to select the correction mode and adjusts at least one of a series of imaging operations including feeding sheets of paper to the image forming unit.

In the correction mode set by the service personnel, the image forming apparatus 400 reads the adjustment image data from the storage 12 to form adjustment images based on the adjustment image data on the front sides and back sides of multiple sheets of paper fed from any of the paper cassettes. After forming an adjustment image on a sheet of paper P, the image forming apparatus 400 displays, on the display 18 of the operation panel 48, an instruction for setting the sheet having the adjustment image formed thereon (hereinafter, referred to as adjustment chart T) on the scanner 300. The service personnel operates the scanner 300 to read the adjustment chart T, following the instruction on the display 18. After the scanner 300 reads the adjustment image, the image forming apparatus 400 measures a positional relationship between an end of the adjustment chart T (sheet) and evaluation marks 1 (see FIG. 3) formed on the adjustment chart and/or a positional relationship between an end of the adjustment chart T (sheet) and a frame line 3 (see FIG. 3) from the read data, to calculate an offset from an ideal position. Two or more outputted adjustment charts T are subjected to this series of operations. The image forming apparatus 400 averages the calculated offset amounts by the number of the sheets of paper outputted, to correct the magnification of the image and perform image adjustment, such as adjusting the writing start position of the writing device 102, according to the average of the offset amounts.

The correction of the image magnification and the adjustment of the writing start position of the writing device 102 are disclosed, for example, in Japanese Patent No. 6436380, therefore, a detailed description thereof is omitted.

In such a manner, the image forming apparatus 400 can form an image on the sheet at a desired position by adjusting the writing start position. Further, the image forming apparatus 400 can form an image on the sheet at a desired magnification by correcting the magnification. The image forming apparatus 400 can form adjustment images on the front side and the back side of the sheet and reduce error in magnification and differences in positions of images between the front and back sides by adjusting the writing start position of the writing device 102 and correcting the magnification of the image on each of the front side and the back side.

Distances from the paper cassettes to locations abutting on the photoconductor drums 115K to 115M differ from one another, and the paper feeding units are individually provided for the paper cassettes. This may cause a difference in offset amounts of an image on the sheet from a desired position depending on the paper cassettes. Depending on a type (such as thickness or material) of sheets of paper stored in the paper cassettes, the offset amount of an image formed on the sheet from a desired position or an image magnification may vary. According to the present embodiment, thus, the image forming apparatus 400 sets the correction mode for each of the paper cassettes to calculate a correction amount for each of them.

Figure 3A:
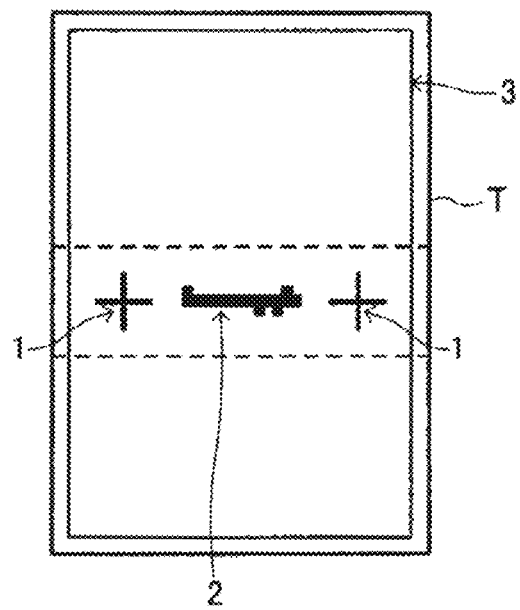
FIGS. 3A and 3B illustrate adjustment images or adjustment charts formed on a sheet of paper.
Figure 3B:
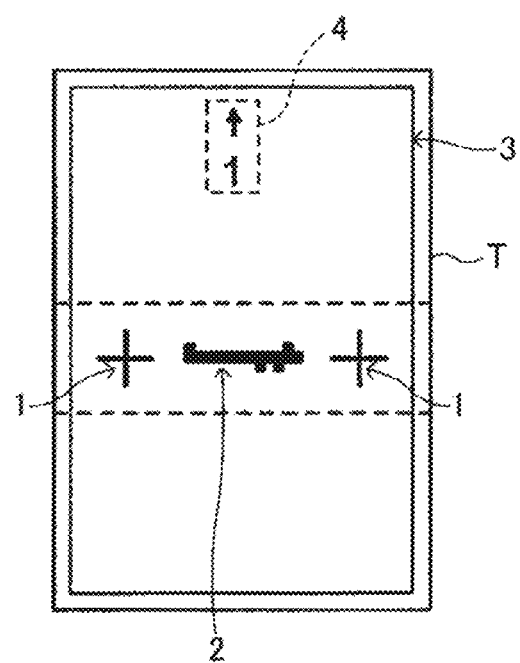

FIGS. 3A and 3B illustrate adjustment images or adjustment charts T formed on the sheet of paper P.

As illustrated in FIG. 3A, the adjustment image includes cross-shaped evaluation marks 1, a single identification mark 2, and a frame line 3. The evaluation marks 1 are located at both ends of the central part of the sheet of paper P in a sub-scanning direction (paper longitudinal direction and paper feeding direction of the image forming apparatus). The single identification mark 2 is located at a center of the sheet of paper P.

In response to a user's request, the image forming apparatus 400 may form an indicator mark 4 for indicating the direction and order of the sheets of paper P to set on the scanner 300, as illustrated in FIG. 3B, for example.

The identification mark 2 holds a plurality of items of identification information for identifying a read image such as reading-side information (front side or back side), cassette-number information, and page-number information (order of output). The scanner 300 reads the identification mark 2 to acquire the items of identification information from the shape of the read identification mark 2.

Figure 4:
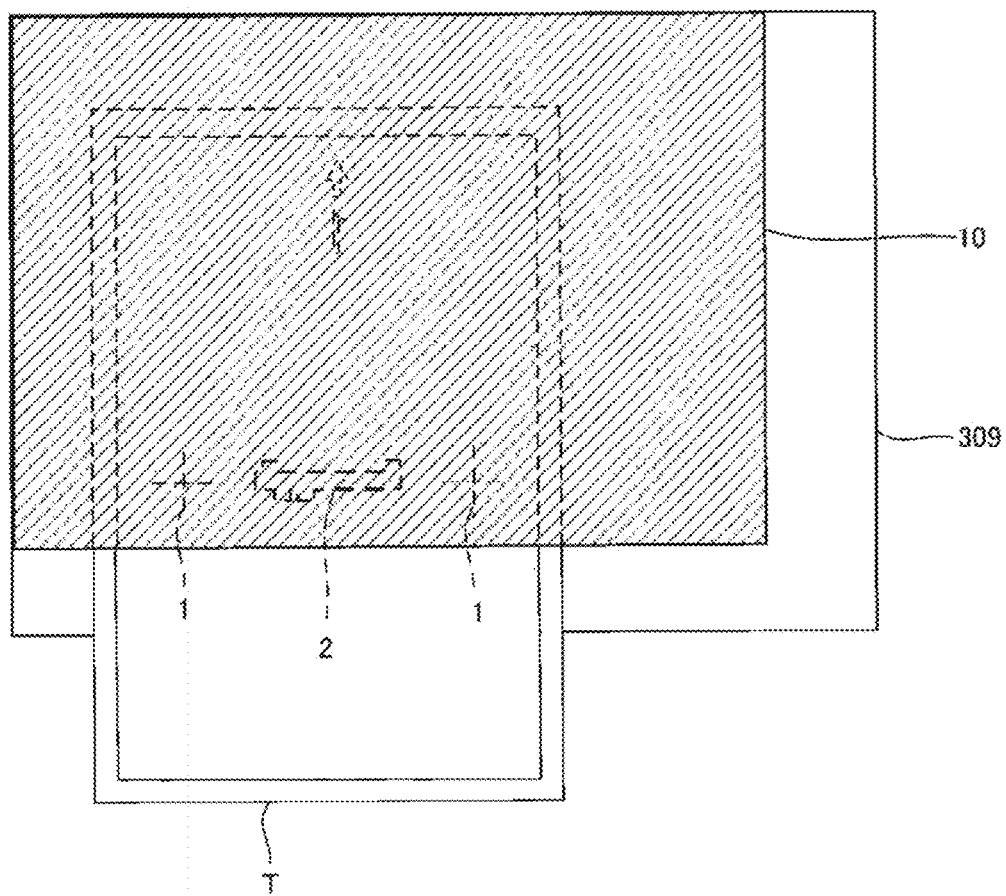
FIG. 4 is a view illustrating an example of reading an adjustment image.

FIG. 4 illustrates an example of reading an adjustment image.

As illustrated in FIG. 4, an adjustment chart T being a sheet of paper with the adjustment image is set on the scanner 300 in a posture rotated by 90 degrees with respect to a general setting of the sheet of paper P on the scanner 300. Next, a solid black background chart 10 is placed on the adjustment chart T set on the scanner 300, to protrude from an end thereof.

Such a background chart 10 is used for the following reason. That is, in order to measure a positional relationship among the end of the adjustment chart T, the evaluation marks 1, and the frame line 3, it is necessary to identify the outer periphery of the adjustment chart T (sheet). Generally, an opposing member such as a document pressing plate opposing the contact glass 309 of the scanner 300 has white color the same as the paper. Because of this, the image forming apparatus cannot identify the end of the adjustment chart T (sheet) and the boundary between the end of the adjustment chart T and the opposing member from the read image by the scanner 300. In view of this, the background chart 10 is placed on the adjustment chart T set on the scanner 300, protruding from the end of the adjustment chart T, in order to highlight the background of the adjustment chart T for reading.

In the present embodiment, in order to read the adjustment chart T and the background chart 10 protruding from the end of the adjustment chart T, the adjustment chart T is set with the end thereof apart from the end of the contact glass 309. Thus, the adjustment chart T having a certain size or more partially protrudes from the contact glass 309 of the scanner 300. In view of this, as illustrated in FIG. 4, the adjustment chart T is set on the scanner 300 in a posture rotated by 90 degrees from a general setting direction, to read one side of the front side of the adjustment chart T in the sub-scanning direction. Then, the adjustment chart T is rotated by 180 degrees to read the other side of the front side of the adjustment chart T in the sub-scanning direction. In such a manner, the front side of the adjustment chart T having a certain size or more is subjected to two reading operations to be able to read the entire adjustment image thereon.

Next, the adjustment chart T is turned over and subjected to the reading operation twice in the same manner as above to read the entire adjustment image on the back side of the adjustment chart T. In the present embodiment the adjustment chart T being a sheet of paper P is provided with the single identification mark 2 on both of the front side and the back side, and the identification marks 2 have different shapes.

In the present embodiment, an adjustment chart T of a smaller size, which can be set with an end thereof apart from the end of the contact glass 309 and not protruding from the contact glass 309, is set on the scanner 300 in a posture rotated by 90 degrees from the general setting direction, as above. The adjustment chart T is rotated by 180 degrees after one side of the adjustment chart T is read in the sub-scanning direction, to read the other side of the adjustment chart T in the sub-scanning direction. This is because reading the smaller-sized adjustment chart T and the larger-sized adjustment chart T in different manners requires two individual control programs for the smaller size and larger size, which will complicate the control. Further, different settings of the adjustment chart T depending on the size, small or large, may make the operator confused. Thus, in the present embodiment, the smaller-sized adjustment chart T is set in the same manner as the larger-sized adjustment chart T to read the entire adjustment image formed on the adjustment chart T through two read operations.

Figure 5:
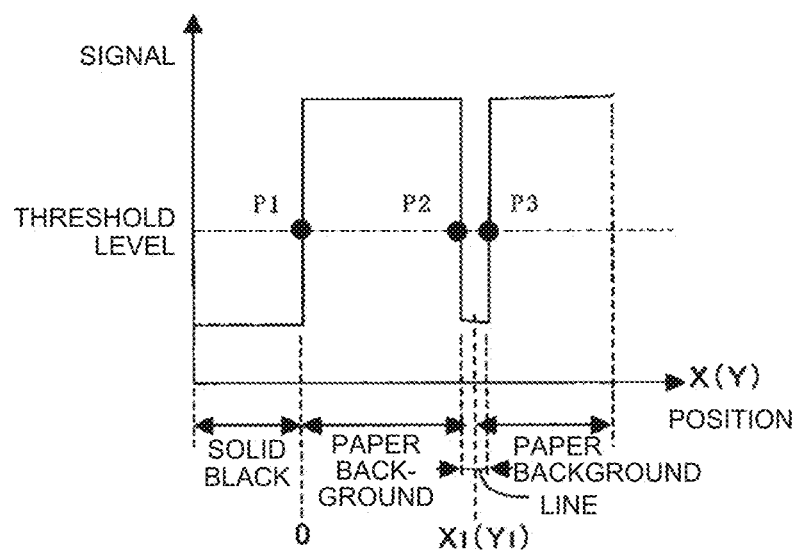
FIG. 5 is a view illustrating an exemplary primary signal from one end to an evaluation mark of an adjustment chart being a sheet of paper provided with an adjustment image.

FIG. 5 illustrates an example of a primary signal from one end of the adjustment chart T, being a sheet of paper with an adjustment image, to the evaluation mark 1.

The image forming apparatus 400 analyzes a read image to acquire a primary signal in the main-scanning direction of the sheet (paper lateral direction; X direction in FIG. 5) near the center of the sheet in the sub-scanning direction, as illustrated in FIG. 5. The image forming apparatus 400 sets a given threshold level to the primary signal, to detect intersections between the threshold level and the primary signal, a paper end P1 in the main-scanning direction, and edge positions P2 and P3 of a straight line of the evaluation mark 1. The straight line is orthogonal to the main-scanning direction. The image forming apparatus 400 then calculates a distance from the paper end P1 to the edge position P2 and a distance from the paper end P1 to the edge position P3, to calculate a central position $X_1$ of the straight line of the evaluation mark 1 in the main-scanning direction from the distances. Similarly, in the sub-scanning direction (Y direction) the image forming apparatus 400 detects a primary signal in the vicinity of an end of the sheet, a paper end, and two edge positions of the straight line of the evaluation mark 1 orthogonal to the sub-scanning direction, to calculate a central position $Y_1$ of the straight line of the evaluation mark 1. Thereby, the intersection coordinates of the cross lines of the evaluation mark 1 with reference to one corner of the sheet are calculated. Similarly, the image forming apparatus 400 calculates the position of the frame line 3 and a distance from the end of the sheet to the frame line 3. The image forming apparatus 400 calculates an offset amount of an imaging position from an ideal position from the coordinates of the evaluation mark 1 and the distance from the end of the sheet to the frame line 3 as calculated as above, to correct an image magnification and perform image adjustment such as adjustment of the writing start position of the writing device 102.

In the present embodiment, as described above, the image forming apparatus 400 acquires four read images of one adjustment chart T, that is, both sides of the front side of the adjustment chart T and both sides of the back side of the adjustment chart T in the sub-scanning direction. In the present embodiment, the image forming apparatus 400 also generates read images of a plurality of adjustment charts T. It is thus necessary to identify which side of an adjustment chart T is read and which one of adjustment charts T is read. For this purpose, the adjustment charts T include the identification mark 2. The identification mark 2 contains identification information to be read by the scanner 300. The identification information is used for identifying, from the shape of the read identification mark 2, which side of the adjustment chart T is read and which one of the adjustment charts T is read. Specifically, from the shape of the identification mark 2, side identification information, sheet-number identification information, sub-scanning identification information, and cassette-number identification information are acquired. The side identification information is for use in identifying the front side or the back side. The sheet-number identification is for use in identifying in which order the sheet has been output. The sub-scanning identification information is for use in identifying which side of the adjustment chart T in the sub-scanning direction is read. The cassette-number identification information is for use in identifying from which one of the paper cassettes the sheet is fed.

In such a manner, the image forming apparatus 400 utilizes the read identification mark 2 and the items of identification information to detect an operator's operational error such as forgetting to rotate the adjustment chart T by 180 degrees, forgetting to turn over the adjustment chart T and redundantly reading the same side, or setting a previously read adjustment chart T again on the scanner 300. With an operator's operational error found from the acquired identification information, the image forming apparatus 400 displays warning to prompt the operator to set the adjustment chart T correctly.

The identification mark 2 is formed at the center of the adjustment chart T to be able to be read from both sides in the sub-scanning direction. That is, the identification mark 2 is located at the center of the sheet so that typical paper sizes usable in the image forming apparatus can include the identification mark 2, when their images are read before and after 180-degree rotation of the sheet. In addition, the identification mark 2 is a non-point-symmetrical symbol. Thus, the identification mark 2, when read from one side and the opposite side of the adjustment chart T in the sub-scanning direction, differs in shape. This makes it possible to know from the difference in shape which side of the adjustment chart T in the sub-scanning direction is read.

Traditionally, the adjustment chart includes, on both sides in the sub-scanning direction, a sheet-number identification mark to identify a page number, a side identification mark indicating the front side or back side of a sheet, a sub-scanning identification mark indicating either side of the adjustment chart in the sub-scanning direction, and cassette-number identification mark indicating from which one of the paper cassettes the sheet is fed. In the present embodiment, the sheets of paper set in the paper cassettes have an adjustment image formed thereon. Small-sized sheets of paper set in the paper cassette have the identification marks 2, the evaluation mark 1, the frame line 3, and the indicator mark 4 formed thereon. As for a conventional adjustment image, however, a plurality of identification marks 2 is formed dispersedly across the entire side of the sheet. Thus, the identification marks 2 occupy a large area of the sheet so that the adjustment image may not be able to be formed on small-sized sheets of paper.

To the contrary, in the present embodiment, only one identification mark 2, from which multiple items of identification information can be acquired, is provided at the center of the adjustment chart T to be readable from both sides in the sub-scanning direction. This eliminates the necessity to redundantly ensure the area for the identification marks 2 on both sides of a sheet of paper in the sub-scanning direction. Thereby, the adjustment image can be formed on small-sized sheets.

Moreover, in the present embodiment the two evaluation marks 1 are also formed in the central part of a sheet of paper. This makes it possible for read images before and after 180-degree rotation of the sheet to include the evaluation marks 1. This eliminates the necessity to redundantly ensure the area for the evaluation marks 2 on both sides of a sheet of paper in the sub-scanning direction. Thereby, the adjustment image can be formed on small-sized sheets.

Further, the identification mark 2 works to allow the operator to check whether the adjustment chart T is correctly set on the scanner 300.

Figure 6A:
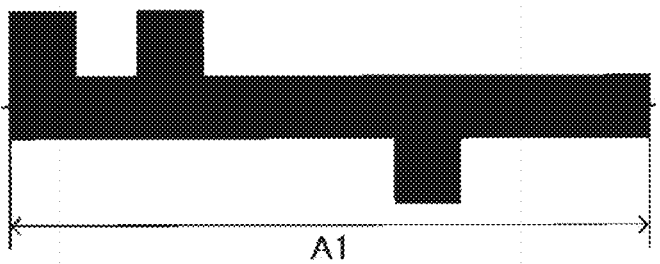
FIG. 6A illustrates an identification mark when the adjustment chart is correctly set.
Figure 6B:
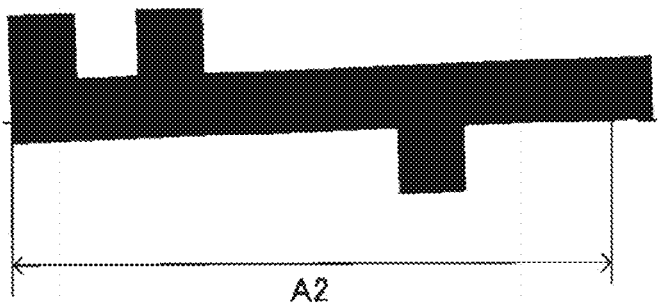
FIG. 6B illustrates the same when the adjustment chart is obliquely set.

FIG. 6A illustrates the identification mark 2 of the adjustment chart T when correctly set while FIG. 6B illustrates the identification mark 2 of the adjustment chart T when obliquely set.

As illustrated in FIG. 6A, when the adjustment chart T is set correctly, the identification mark 2 has a length A1 in the main-scanning direction at a given position of a read image in the sub-scanning direction (such as the coordinates of one of the two evaluation marks 1 in the sub-scanning direction). When the adjustment chart T is obliquely set as illustrated in FIG. 6B, the identification mark 2 has a length A2 shorter than the length A1 in the main-scanning direction at the same position. It may not be able to correct the image magnification accurately from the read image of the adjustment chart T set obliquely. In view of this, after finding that the identification mark has a length of a predefined value or less in the main-scanning direction at a given position in the sub-scanning direction of a read image, the image forming apparatus 400 displays, on the display 18 of the operation panel 48, an indication for prompting the operator to re-set the adjustment chart. Thereby, the image forming apparatus 400 can accurately correct an image on the basis of a read image of the adjustment chart set correctly.

The above embodiment is merely exemplary. The following aspects of the embodiment individually attain unique effects.

First Aspect

Adjustment image data is for use in imaging operation. The adjustment image data is stored in a storage such as the storage 12 of the image forming apparatus 400 and read from the storage to form an image on a sheet of paper at the time of adjusting an imaging operation of the image forming apparatus. The adjustment image data includes a single identification mark 2 located in the vicinity of a longitudinal center of the sheet of paper.

Small-sized sheets of paper can be set without protruding from a platen such as the contact glass 309 of the scanner 300 serving as a reading device. However, differently setting, on the platen, large-sized sheets protruding from the platen and small-sized sheets not protruding from the platen or reading them in different manners require individual control programs for large-sized sheets and small-sized sheets, which may result in complication of the control. Further, different settings of the sheets depending on the paper size, small or large, may make the operator confused. Thus, the entire adjustment image on the smaller-sized sheet is read multiple times in the same manner as that on the larger-sized sheet. If, as in the conventional manner, small-sized sheets of paper are provided with the identification marks 2 on both longitudinal sides thereof such that read images before and after 180-degree rotation of the sheet can include the identification marks 2, the small-sized paper may not be able to include an adjustment image for use in imaging operation.

In view of this, in the first aspect the identification mark 2 is formed near a longitudinal center of a sheet of paper. As a result, the read images before and after the 180-degree rotation of sheets of any size generally useable in the image forming apparatus can all include the identification mark 2, to enable identification information to be acquired from each read image. The identification mark 2 is located only in the vicinity of the center of the sheet, therefore, it is not necessary to redundantly ensure the areas for forming the identification marks 2 on both longitudinal sides of the sheet, unlike the conventional example. Thus, small-sized sheets of paper can include the adjustment image.

Second Aspect

The adjustment image data of the first aspect includes evaluation marks 1 located on both lateral sides of the sheet of paper in the vicinity of the longitudinal center of the sheet of paper.

As a result, read images before and after the 180-degree rotation of the sheet can include the evaluation marks 1, as described in the embodiment. This eliminates the necessity to redundantly ensure the areas for forming the evaluation marks 1 on both sides of the sheet in the sub-scan direction. Thus, small-sized sheets of paper can include the adjustment image.

Third Aspect

In the first or second aspect, the single identification mark 2 includes a plurality of items of identification information.

Thereby, as described in the embodiment, multiple items of identification information can be acquired from the identification marks 2 included in each read image.

Fourth Aspect

In any one of the first to third aspects, the single identification mark 2 includes at least one item of identification information among posture identification information, sheet-number identification information, side identification information, and cassette-number identification information. The posture identification information represents a posture of the sheet of paper set to a reading device. The sheet-number identification information represents in what order the sheet of paper has been output. The side identification information represents the front side or the back side of the sheet of paper. The cassette-number identification information represents from which one of the paper cassettes the sheet of paper has been fed.

This makes it possible to detect an operator's operational error from the identification information acquired from the identification mark, as described in the embodiment.

Fifth Aspect

In any one of the first to fourth aspects, when the sheet of paper is set in a first posture or in a second posture on the platen of a reading device such as the contact glass 309 of the scanner 300, the identification mark 2 is located in a region of the sheet of paper, the region included in an image reading region of the reading device. In the first posture the longitudinal direction of the sheet of paper is orthogonal to the longitudinal direction of the platen. In the second posture the sheet of paper is rotated by 180 degrees from the first posture.

Thereby, the identification mark can be included in the read images of the sheet of paper in the first posture and in the second posture, as described in the embodiment.

Sixth Aspect

Adjustment image data is for use in imaging operation. The adjustment image data is stored in a storage such as the storage 12 of the image forming apparatus 400 and read from the storage to form an image on a sheet of paper at the time of adjusting an imaging operation of the image forming apparatus. The adjustment image data includes an identification mark located in the vicinity of a longitudinal center of the sheet of paper.

As with the first aspect, read images before and after 180-degree rotation of sheets of paper of any size generally useable in the image forming apparatus can all include the identification mark to enable identification information to be acquired from each read image. The identification mark is located only in the center of the sheet, unlike the conventional example. This eliminates the necessity to redundantly ensure the areas for forming the identification marks 2 on both longitudinal sides of the sheet. Thus, small-sized sheets of paper can include the adjustment image.

Seventh Aspect

The image forming apparatus 400 includes an image forming unit such as the printer 100 that forms an image on a sheet of paper P; an image reader such as the scanner 300 that reads the image from the sheet of paper P; a storage such as the storage 12 that stores adjustment image data for use in imaging operation and including evaluation marks 1; and a controller such as the control unit 15 that reads the adjustment image data from the storage, causes the image forming unit to form an adjustment image for use in imaging operation on the sheet of paper P according to the read image data, causes the image reader to read the adjustment image from the sheet, and adjusts an imaging operation in accordance with read data. The adjustment image data is the adjustment image data according to any of the first to sixth aspects.

Thus, the image forming apparatus 400 can form the adjustment image on small-sized sheets of paper, as described in the embodiment.

According to the present invention, it is made possible to form an adjustment image for use in imaging operation on small-sized sheets of paper.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming apparatus, comprising:
   an image forming unit that forms an image on a sheet of paper;
   an image reader that reads the image from the sheet of paper;
   a memory that stores adjustment image data for use in an imaging operation, the adjustment image data including:
      a single identification mark indicating a plurality of identification information, the identification mark to be located in a vicinity of a longitudinal center of the sheet of paper,
      evaluation marks adjacent to the identification mark and located in the vicinity of the longitudinal center of the sheet of paper,
      an indicator mark to indicate a feed direction of the sheet of paper, and
      a frame line to surround the identification mark, the evaluation marks and the indicator mark; and
   control circuitry configured to
      read the adjustment image data from the memory,
      control the image forming unit to form an adjustment image for use in the imaging operation on the sheet of paper according to the read image data, the adjustment image including the identification mark, the evaluation marks, the indicator mark and the frame line, and
      control the image reader to read the adjustment image, and adjust an imaging operation in accordance with read data.

2. The image forming apparatus according to claim 1, wherein the evaluation marks are located on both lateral sides of the sheet of paper in the vicinity of the longitudinal center of the sheet of paper.

3. The image forming apparatus according to claim 1, wherein
   the plurality of identification information includes at least one of identification information among posture identification information, sheet-number identification information, side identification information, and cassette-number identification information,
   the posture identification information indicating a posture of the sheet of paper set to a reading device,
   the sheet-number identification information indicating an order in which the sheet of paper has been output,
   the side identification information indicating a front side or a back side of the sheet of paper, and
   the cassette-number identification information indicating from which one of paper cassettes the sheet of paper has been fed.

4. The image forming apparatus according to claim 1, wherein
   in a case that the sheet of paper is set on a platen of a reading device in a first posture or in a second posture, the identification mark is located in a region of the sheet of paper,
   the region being an image reading region of the reading device,
   the first posture being in which a longitudinal direction of the sheet of paper is orthogonal to a longitudinal direction of the platen, and
   the second posture being in which the sheet of paper is rotated by 180 degrees from the first posture.

5. A control device for controlling an image forming apparatus, the control device comprising:
   a memory that stores adjustment image data for use in an imaging operation, the adjustment image data including:
      a single identification mark indicating a plurality of identification information, the identification mark to be located in a vicinity of a longitudinal center of a sheet of paper,
      evaluation marks adjacent to the identification mark and located in the vicinity of the longitudinal center of the sheet of paper,
      an indicator mark to indicate a feed direction of the sheet of paper, and
      a frame line to surround the identification mark, the evaluation marks and the indicator mark; and
   control circuitry configured to
      read the adjustment image data from the memory,
      control an image forming unit of the image forming apparatus to form an adjustment image for use in the imaging operation on the sheet of paper according to the read image data, the adjustment image including the identification mark, the evaluation marks, the indicator mark and the frame line, and control an image reader of the image forming apparatus to read the adjustment image, and adjust an imaging operation in accordance with read data.

6. The control device according to claim 5, wherein the evaluation marks are located on both lateral sides of the sheet of paper in the vicinity of the longitudinal center of the sheet of paper.

7. The control device according to claim 5, wherein the plurality of identification information includes at least one of identification information among posture identification information, sheet-number identification information, side identification information, and cassette-number identification information, the posture identification information indicating a posture of the sheet of paper set to a reading device, the sheet-number identification information indicating an order in which the sheet of paper has been output, the side identification information indicating a front side or a back side of the sheet of paper, and the cassette-number identification information indicating from which one of paper cassettes the sheet of paper has been fed.

8. The control device according to claim 5, wherein in a case that the sheet of paper is set on a platen of a reading device in a first posture or in a second posture, the identification mark is located in a region of the sheet of paper, the region being an image reading region of the reading device, the first posture being in which a longitudinal direction of the sheet of paper is orthogonal to a longitudinal direction of the platen, and the second posture being in which the sheet of paper is rotated by 180 degrees from the first posture.

9. A non-transitory computer readable medium storing computer executable instructions which, when executed by a control device for controlling an image forming apparatus, causes the control device to:

store adjustment image data for use in an imaging operation, the adjustment image data including:

a single identification mark indicating a plurality of identification information, the identification mark to be located in a vicinity of a longitudinal center of a sheet of paper, evaluation marks adjacent to the identification mark and located in the vicinity of the longitudinal center of the sheet of paper, an indicator mark to indicate a feed direction of the sheet of paper, and a frame line to surround the identification mark, the evaluation marks and the indicator mark;

read the adjustment image data;

control an image forming unit of the image forming apparatus to form an adjustment image for use in the imaging operation on the sheet of paper according to the read image data, the adjustment image including the identification mark, the evaluation marks, the indicator mark and the frame line, and control an image reader of the image forming apparatus to read the adjustment image, and adjust an imaging operation in accordance with read data.

10. The non-transitory computer readable medium according to claim 9, wherein the evaluation marks are located on both lateral sides of the sheet of paper in the vicinity of the longitudinal center of the sheet of paper.

11. The non-transitory computer readable medium according to claim 9, wherein the plurality of identification information includes at least one of identification information among posture identification information, sheet-number identification information, side identification information, and cassette-number identification information, the posture identification information indicating a posture of the sheet of paper set to a reading device, the sheet-number identification information indicating an order in which the sheet of paper has been output, the side identification information indicating a front side or a back side of the sheet of paper, and the cassette-number identification information indicating from which one of paper cassettes the sheet of paper has been fed.

12. The non-transitory computer readable medium according to claim 9, wherein in a case that the sheet of paper is set on a platen of a reading device in a first posture or in a second posture, the identification mark is located in a region of the sheet of paper, the region being an image reading region of the reading device, the first posture being in which a longitudinal direction of the sheet of paper is orthogonal to a longitudinal direction of the platen, and the second posture being in which the sheet of paper is rotated by 180 degrees from the first posture.

* * * * *